United States Patent
Nakase

(10) Patent No.: US 8,643,858 B2
(45) Date of Patent: Feb. 4, 2014

(54) IMAGE FORMING APPARATUS WITH CALIBRATION FUNCTION

(75) Inventor: Takahiro Nakase, Moriya (JP)

(73) Assignee: Canon Kabushiki Kaisha (JP)

( * ) Notice: Subject to any disclaimer, the term of this patent is extended or adjusted under 35 U.S.C. 154(b) by 465 days.

(21) Appl. No.: 12/916,372

(22) Filed: Oct. 29, 2010

(65) Prior Publication Data

US 2011/0116118 A1    May 19, 2011

(30) Foreign Application Priority Data

Nov. 17, 2009   (JP) .................................. 2009-261738

(51) Int. Cl.
G06F 3/12        (2006.01)
H04N 1/46        (2006.01)
G03F 3/08        (2006.01)
G06K 9/00        (2006.01)

(52) U.S. Cl.
USPC .......... 358/1.13; 358/504; 358/518; 358/520; 358/523; 382/162; 382/167

(58) Field of Classification Search
USPC ......... 358/1.13, 523, 504, 518, 520; 382/162, 382/167
See application file for complete search history.

(56) References Cited

U.S. PATENT DOCUMENTS

| 5,142,356 | A | 8/1992 | Usami et al. |
| 2009/0116083 | A1 * | 5/2009 | Yoshizawa .................... 358/505 |
| 2011/0063633 | A1 * | 3/2011 | Ernst et al. ..................... 358/1.9 |

FOREIGN PATENT DOCUMENTS

| JP | 62-296669 A | 12/1987 |
| JP | 63-185279 A | 7/1988 |
| JP | 2005-303701 A | 10/2005 |
| JP | 2009-117890 A | 5/2009 |

OTHER PUBLICATIONS

JP OA issued Jul. 9, 2013 for corresponding JP 2009-261738.

* cited by examiner

*Primary Examiner* — Fred Guillermety
(74) *Attorney, Agent, or Firm* — Rossi, Kimms & McDowell LLP

(57) ABSTRACT

An image forming apparatus with a plurality of reading units, which is capable of easily adding a recording sheet type usable for calibration. Calibration is executed using a specific recording sheet. Gradation patterns are formed on a recording sheet of a sheet type to be added, and are read by a reader unit. A first conversion table is configured based on information on the read image. A second conversion table is configured based on the first conversion table. When the reader unit is used to perform calibration using the added recording sheet, image forming conditions are set based on information on the image read by the reader unit and the first conversion table, and when the color sensor is used, the image forming conditions are set based on information on the image read by the color sensor and the second conversion table.

3 Claims, 14 Drawing Sheets

IMAGE FORMING APPARATUS WITH CALIBRATION FUNCTION

BACKGROUND OF THE INVENTION

1. Field of the Invention

The present invention relates to an image forming apparatus applied to a printer or a copying machine which performs image formation e.g. by electrophotography.

2. Description of the Related Art

Conventionally, image forming apparatuses, such as a copying machine and a printer, use a technique of calibrating an output image. For example, there has been proposed a technique of improving image quality by forming a certain specific pattern on a recording sheet, subsequently reading image information, such as density, chromaticity, etc. of the formed pattern, by an image reader unit, and then configuring image forming conditions based on the image information (see Japanese Patent Laid-Open Publication No. S62-296669 and Japanese Patent Laid-Open Publication No. S63-185279).

However, in the above-mentioned prior art, a recording sheet for use in calibration is limited to a specific type so as to improve the stability of image quality. This leads to a problem that if an image is recorded on a different recording sheet from the recording sheet for calibration, image characteristics are not ensured.

As a solution to this problem, it can be envisaged to add a recording sheet type that can be used for calibration. More specifically, in adding a recording sheet type usable for calibration, calibration is performed on a recording sheet of a specific type first, and then in a state where a result of the calibration is set, a predetermined image is recorded on a recording sheet of the type to be added. Then, the predetermined image recorded on the recording sheet of the type to be added is read by a reading unit. Further, based on image information read from the predetermined image recorded on the recording sheet of the type to be added, settings for converting image information read from the predetermined image on a recording sheet of the type to be added are generated and stored. Then, in the case of performing calibration using a recording sheet of the added sheet type, image forming conditions are configured based on the predetermined image on the recording sheet and the settings.

However, if an image forming apparatus having a plurality of reading units is used, the above-described method suffers from the following problem:

Different reading units deliver respective outputs which are different in image characteristics even when the same object is read. Therefore, it is required to configure settings for converting read image information on a reading unit-by-reading unit basis. For this reason, even if one reading unit adds a recording sheet and store settings for converting read image information, by the above-described method, the settings cannot be applied to an another reading unit. In short, to enable reading units to cope with a recording sheet to be added, it is required to manually configure settings for converting image information, on a recording unit-by-recording unit basis, which takes much time and labor.

SUMMARY OF THE INVENTION

The present invention provides an image forming apparatus with a plurality of reading units, which is capable of easily adding a recording sheet type usable for calibration.

The present invention provides a image forming apparatus that has a calibration function of forming a predetermined image on a recording medium, reading the predetermined image formed on the recording medium, and setting image forming conditions based on information on the read predetermined image, comprising a first reading unit configured to read the predetermined image on the recording medium, a second reading unit provided separately from the first reading unit and configured to read the predetermined image on the recording medium, a first configuration unit configured to be operable when a recording medium type that is usable for the calibration function is to be added, to execute the calibration function using a specific recording medium, form the predetermined image on a recording medium other than the specific recording medium, which is of the recording medium type to be added, in a state where image forming conditions obtained as a result of the execution of the calibration function are set, cause the first reading unit to read the predetermined image formed on the recording medium of the type to be added, and configure a first conversion table based on information on the read predetermined image, a second configuration unit configured to configure a second conversion table based on the first conversion table configured by the first configuration unit, using a correlation table representing a correlation in reading characteristic between the first reading unit and the second reading unit, and a setting unit configured to be operable when the first reading unit is used to execute the calibration function using the added recording medium, to set the image forming conditions based on image information read by the first reading unit and the first conversion table, and when the second reading unit is used, to set the image forming conditions based on image information read by the second reading unit and the second conversion table.

According to the present invention, it is possible to easily add a recording sheet type available for calibration in an image forming apparatus having a plurality of reading units.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
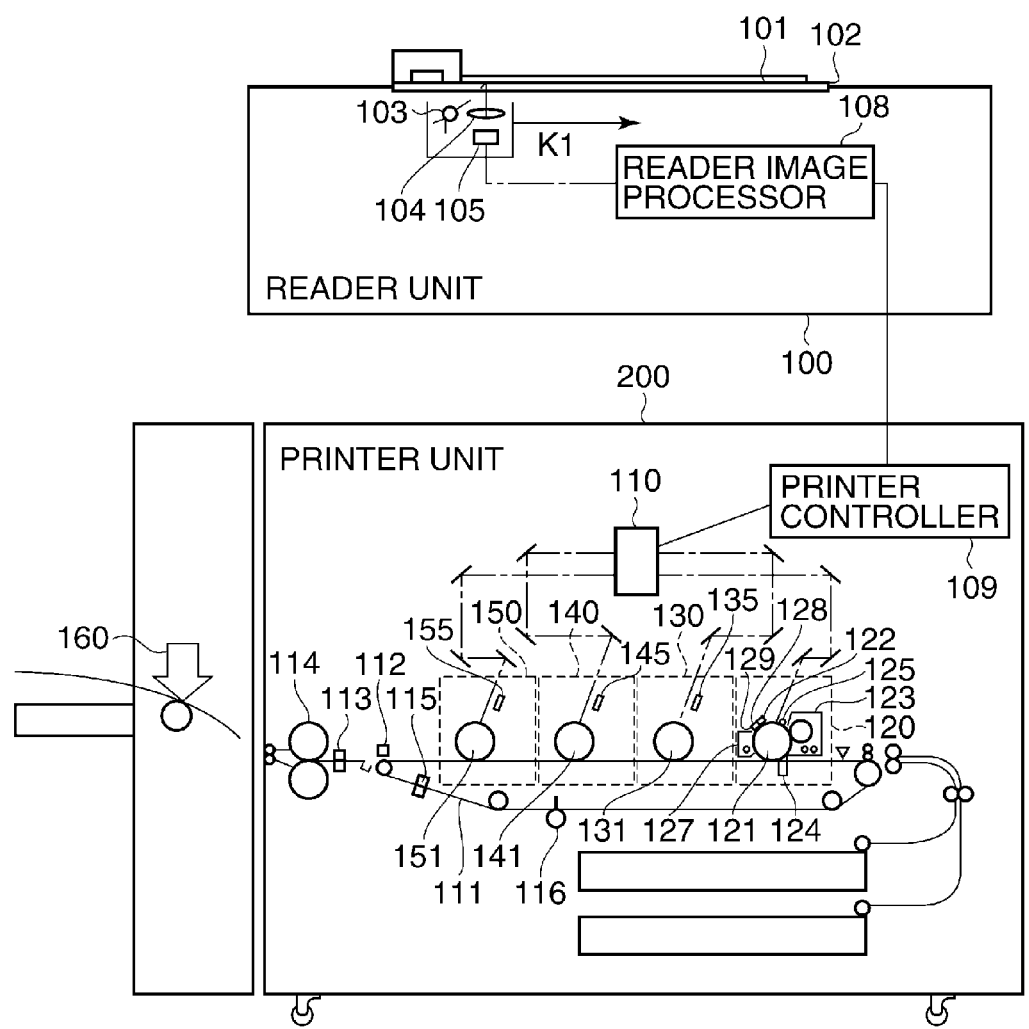
FIG. 1 is a schematic cross-sectional view of a color copying machine as an image forming apparatus according to a first embodiment of the present invention.

FIG. 1 is a schematic cross-sectional view of a color copying machine as an image forming apparatus according to a first embodiment of the present invention.

In the present first embodiment, the image forming apparatus is applied, by way of example, to the color copying machine, which is of an electrophotographic and includes a plurality of drums. However, this is not limitative, but the present invention can also be applied to other various types of electrophotographic copying machines, printers, and image forming apparatuses of monocolor or non-electrophotographic types.

The color copying machine shown in FIG. 1 performs an image forming operation as follows:

In a reader unit 100 (an example of a first reading unit), an original placed on an original platen glass 102 is irradiated with light from a light source 103, and reflected light from the original passes through an optical system 104 to form an image on a CCD sensor 105. The reading optical system unit performs scanning in a direction indicated by an arrow k1 to thereby convert the original into line-by-line electric signal data rows.

The image signals obtained by the CCD sensor 105 are subjected to image processing by a reader image processor 108, and then are delivered to a printer unit 200, where a printer controller 109 performs image processing adapted to the printer unit 200.

The image signals are converted to pulse-width modulated (PWM) laser beams by the printer controller 109. Each of the laser beams scanned by a polygon scanner 110 is irradiated onto an associated one of photosensitive drums 121, 131, 141, and 151 of respective image forming units 120, 130, 140, and 150.

The yellow (Y) image forming unit 120, the magenta (M) image forming unit 130, the cyan (C) image forming unit 140, and the black (Bk) image forming unit 150 form images of the respective associated colors. The image forming units 120, 130, 140, and 150 are substantially identical in construction and operation. Therefore, in the following, the Y image forming unit 120 will be described in detail, and description of the other image forming units is omitted.

The Y image forming unit 120 comprises the photosensitive drum 121, a primary electrostatic charger 122, a developing device 123, and a transfer blade 124. A laser beam from the polygon scanner 110 forms an electrostatic latent image on the surface of the photosensitive drum 121. The primary electrostatic charger 122 charges the surface of the photosensitive drum 121 to a predetermined potential to make the same prepared for forming the electrostatic latent image. The developing device 123 develops the electrostatic latent image on the photosensitive drum 121 to thereby form a toner image. The transfer blade 124 performs electric discharge from the reverse surface of a transfer belt 111 to thereby transfer the toner image on the photosensitive drum 121 onto a recording sheet or the like on the transfer belt 111.

After the toner image is transferred onto the transfer belt 111, the photosensitive drum 121 has the surface thereof cleaned by a cleaner 127 and destaticized by an auxiliary charger 128, and further, residual charge remaining on the photosensitive drum 121 is removed by a pre-exposure lamp 129 such that the primary electrostatic charger 122 can properly electrostatically charge the same again.

Further, the recording sheet or the like having the toner image transferred thereon is conveyed by the transfer belt 111, and then toner images of the respective colors formed on the M, C, and Bk image forming units 120 to 150, respectively, are sequentially transferred onto the recording sheet or the like, whereby a four-color image is formed on the surface of the recording sheet or the like. The recording sheet or the like having passed the Bk image forming unit 150 is destaticized by a destaticizing charger 112, and is then separated from the transfer belt 111. After the recording sheet or the like is separated from the transfer belt 111, the transfer belt 111 is destaticized by a transfer belt destaticizing charger 115, and is then cleaned by a belt cleaner 116, whereby the transfer belt 111 gets prepared for attracting a recording sheet or the like again.

The separated recording sheet or the like is charged by a pre-fixation charger 113 so as to supplement toner adhesiveness to thereby prevent occurrence of image disturbance, and then the toner image is fixed by a fixing device 114. On a conveying path downstream of the fixing device 114, there is disposed a color sensor 160 (an example of a second reading unit) implemented by a CIS (Contact Image Sensor). The color sensor 160 is capable of reading e.g. a group of patches printed on a recording sheet during conveyance of the recording sheet.

The reader image processor 108 and the printer controller 109 are controlled by an MFP controller 60 that controls the overall operation of the color copying machine of the present embodiment. The MFP controller 60 comprises a CPU (Central Processing Unit), not shown, which executes programs, a RAM (Random Access Memory), not shown, which is used e.g. as a work area for the CPU, and a ROM (Read Only Memory), not shown, which stores the programs.

Figure 2:
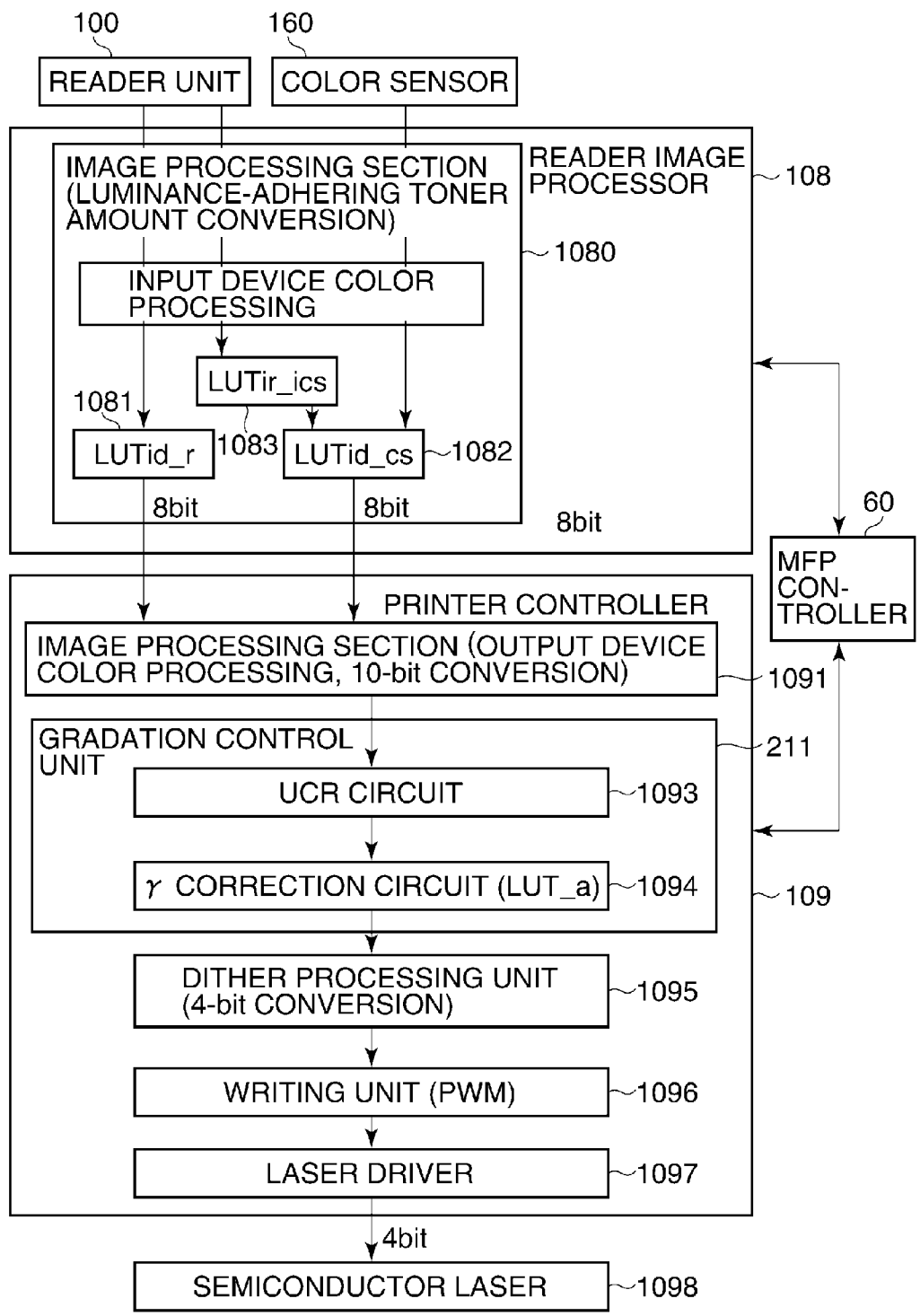
FIG. 2 is a block diagram showing an overall flow of image signals in the color copying machine.

FIG. 2 is a block diagram showing the overall flow of image signals in the present embodiment.

An image signal produced by reading a recording sheet original by the reader unit 100 or the color sensor 160 is input to the reader image processor 108 and is subjected to A/D conversion. Then, in an image processing section 1080 of the reader image processor 108, gamma correction, color processing (input direct mapping), and MTF (Modulation Transfer Function) correction are performed on the signal according to the characteristics of the input device, such as the CCD sensor 105. Depending on the case, the signal is subjected to luminance-adhering toner amount conversion using a conversion table LUTid_r (denoted by reference numeral 1081 in FIG. 2) for the reader unit 100 or a conversion table LUTid_cs (denoted by reference numeral 1082 in FIG. 2) for the color sensor 160, and the resulting image signal is sent to the MFP controller 60.

Thereafter, the image signal is input to the printer controller 109 via the MFP controller 60. Then, in an image processing section 1091 of the printer controller 109, image processing and color processing adapted to the printer unit 200 are performed on the image signal so as to obtain a desired output assuming that the printer unit 200 has ideal output characteristics. Although in the present embodiment, the maximum number of gradations of an input signal is limited to a number (256) corresponding to 8 bits, the number of the gradations is extended to 10 bits in internal processing so as to improve accuracy, and the signal continues to be subjected to 10-bit processing up to dither processing performed by a dither processing unit 1095.

The printer controller 109 includes a gradation control unit 211. The gradation control unit 211 includes a UCR (Under Color Removal) circuit 1093 for limiting the total sum of image signal levels and a γ correction circuit 1094 (conversion table LUT_a), and performs correction so as to ensure both proper gradation characteristics and printer characteristics as a characterizing feature of the present embodiment, thereby adjusting the printer unit 200 to ideal characteristics. The LUT (Look-Up Table)_a is a 10-bit conversion table (defining density correction characteristics) which is generated by image control (calibration) described in detail hereinafter, and is used to change the γ characteristics of the printer output.

The UCR circuit 1093 for limiting the total sum of image signal levels limits an integrated value of image signal levels for each pixel, and when the total sum exceeds a predetermined value, the UCR circuit 1093 reduces the total sum of the image signal levels using a known technique, such as under color removal (UCR) processing for replacing C, M and Y signals by a K signal. The reason for limiting the total sum of the image signal levels is that it is required to limit the adhering toner amount for image formation by the printer unit 200, and printer operation guarantee processing performed in the present embodiment is to prevent occurrence of an image defect or a failure due to an excess of the adhering toner amount with respect to a predetermined value.

The signals output from the gradation control unit 211 are subjected to dithering by the dither processing unit 1095 and are then sequentially delivered to a writing unit 1096. The writing unit 1096 delivers a 4-bit signal subjected to PWM (Pulse Width Modulation) to a semiconductor laser 1098 via a laser driver 1097, to cause emission of laser. For this purpose, the dither processing unit 1095 has a plurality of dither processing circuits so as to not only perform halftone processing for converting a 10-bit image signal to 4-bit data, but also change resolution according to attributes of the image signal.

Hereafter, a description will be given of control of image forming conditions by calibration in the present embodiment.

First, calibration performed using a predetermined specific recording sheet (hereinafter referred to as "the recording sheet α") will be described.

The color copying machine as the image forming apparatus according to the present embodiment is equipped with a first calibration function for controlling a contrast potential and a second calibration function for controlling the γ correction circuit 1094 (conversion table LUT_a).

Figure 3:
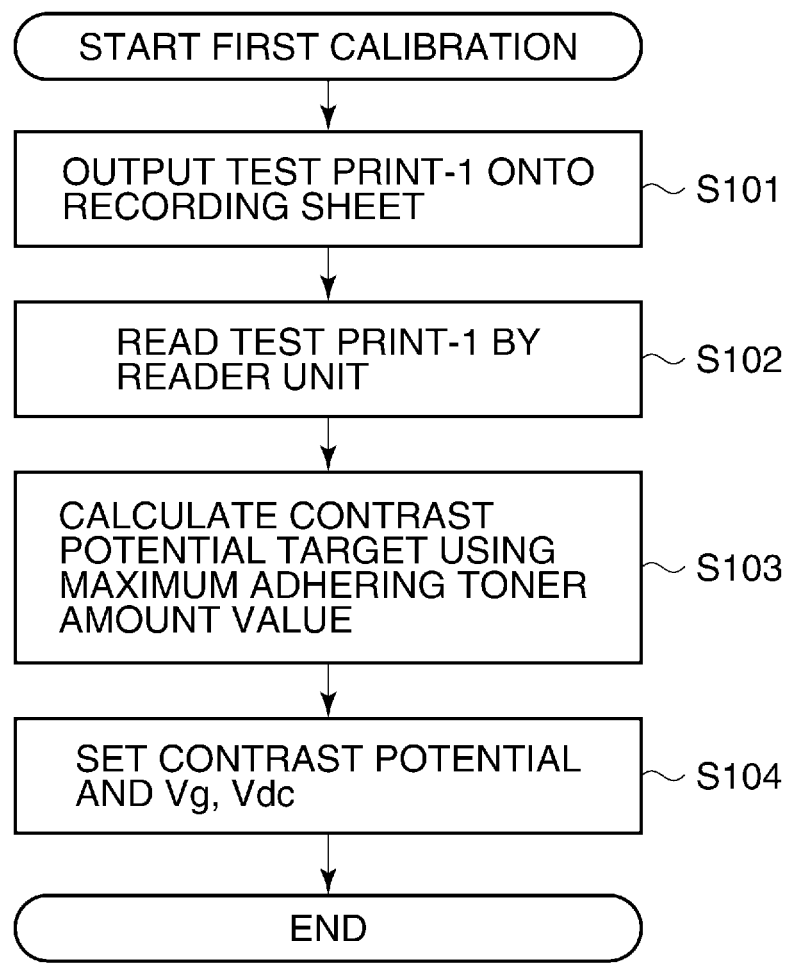
FIG. 3 is a flowchart of a contrast potential-setting process performed using a first calibration function.

First, the first calibration function will be described with reference to FIGS. 3 and 4. FIG. 3 is a flowchart of a contrast potential-setting process performed using the first calibration function.

When the MFP controller 60 starts the present process, a test print-1 is output onto the specific recording sheet α by the image forming process in a step S101. A contrast potential to be used for forming an image of the test print-1 is set to a value predicted to attain a target density under standard conditions in each environment and registered as an initial value in advance.

Figure 4:
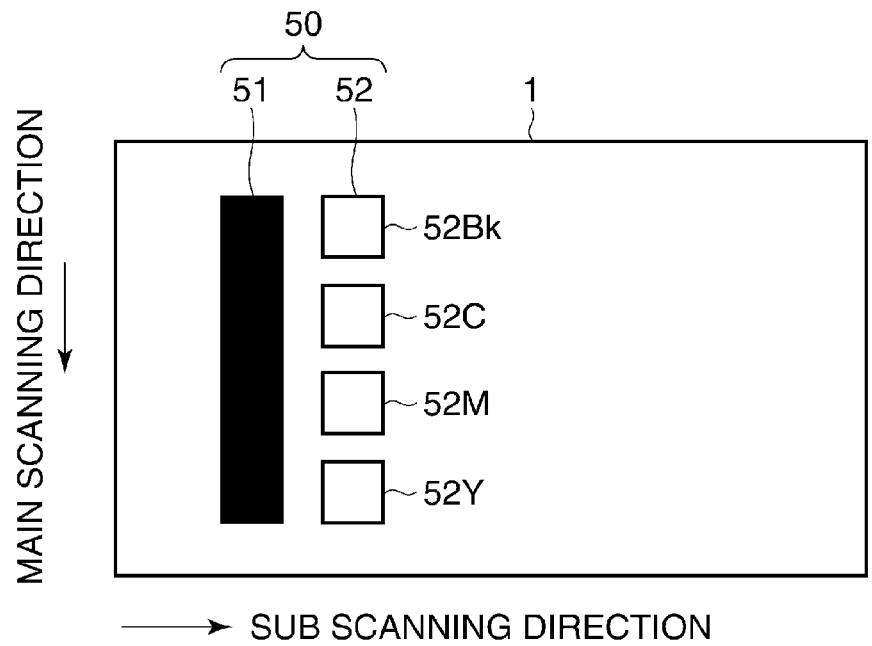
FIG. 4 is a view of a test print output on a recording sheet in the contrast potential-setting process in FIG. 3.

As shown in FIG. 4, the test print-1 comprises a band pattern 51 of halftone densities of four colors Y, M, C, and Bk, and a patch pattern 52 of Y, M, C, and Bk maximum density patches (corresponding to a density signal level of 255). An actual contrast potential used for forming each of the density patches is measured by an associated one of the surface potentiometers 125, 135, 145, and 155.

In the following step S102, the output test print-1 is read by the reader unit 100, and obtained RGB values are converted into adhering toner amounts using a conversion table LUTid_r(α) corresponding to the conversion table LUTid_r 1081 in FIG. 2. The conversion table LUTid_r(α) is configured based on the relationship between adhering toner amounts on the recording sheet α and luminance values obtained by reading in the reader unit 100. Settings for making a recording sheet optionally added by a user (hereinafter referred to as "the recording sheet β" usable for calibration, described hereinafter, are configured by changing the conversion table LUTid_r. It should be noted that the recording sheet β is an example of a recording medium other than the specific recording medium, which is of a recording medium type to be added.

In the following step S103, a contrast potential is calculated using the adhering toner amount obtained in the step S102 and a target maximum adhering toner amount. In the present embodiment, the target maximum adhering toner amount is set to 0.5 mg/cm$^2$ by way of example, and therefore a maximum contrast potential b corresponding to the target maximum adhering toner amount of 0.5 mg/cm$^2$ is calculated by the following equation:

$$b=(a+ka)\times 0.5/Da$$

wherein, the variable "a" represents a contrast potential corresponding to a maximum density which is used at the time point (i.e. (the absolute value of) the difference between a developing bias potential, and a potential of a surface portion of the photosensitive drum corresponding to the aforementioned maximum density patch of each color which is obtained by irradiating the surface portion with a laser beam at the maximum density signal level of 255 using the semiconductor laser 1098, after the aforementioned maximum is primarily charged). "Da" represents a maximum adhering toner amount obtained at the contrast potential "a", and "k" represents a correction coefficient.

In the following step S104, from the maximum contrast potential b, a grid potential Vg and a developing bias potential Vdc associated therewith are determined, and then the maximum contrast potential b, the grid potential Vg, and the developing bias potential Vdc are set. It is possible to determine the grid potential Vg and the developing bias potential Vdc which are required to set the determined maximum contrast potential "b" by a known method.

Next, the second calibration function will be described with reference to FIG. 5 and FIGS. 6A and 6B. Here, a gradation correcting method including adjustment of the aforementioned maximum adhering toner amount, and the role of the gradation control unit 211 are explained.

Figure 5:
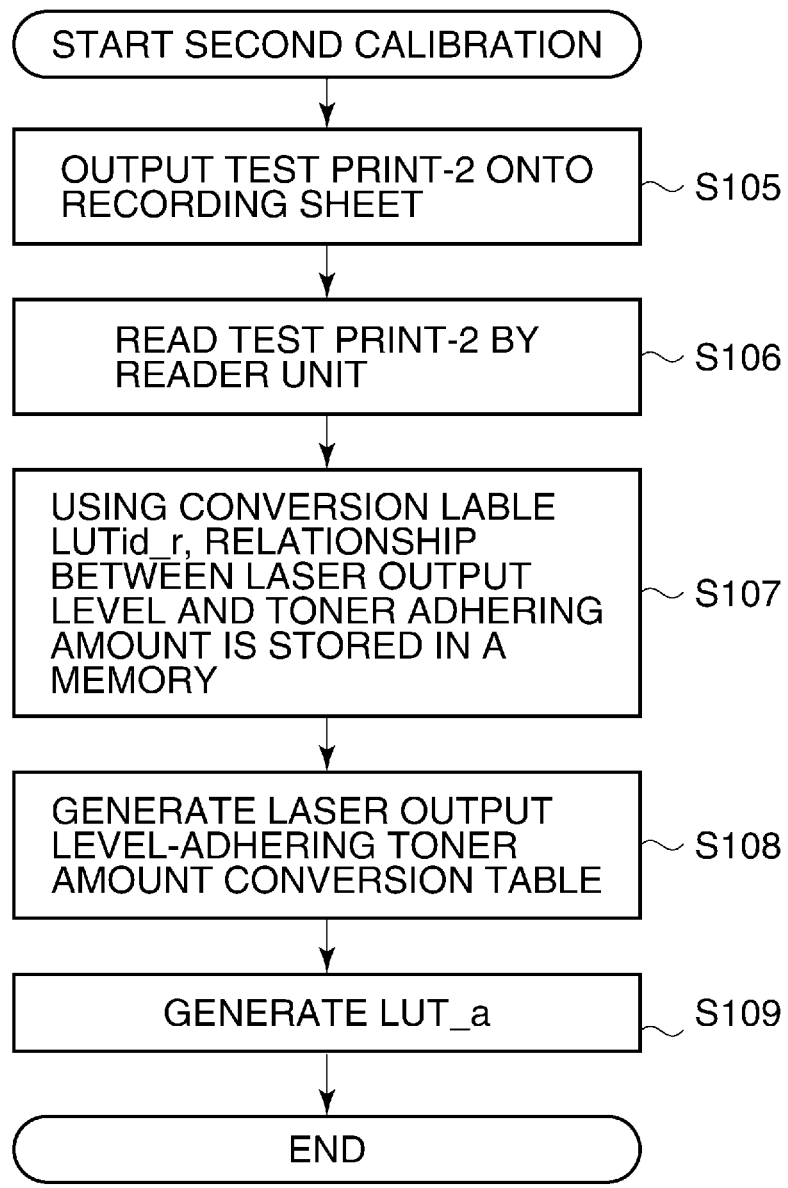
FIG. 5 is a flowchart of a gradation correction process performed using a second calibration function.

FIG. 5 is a flowchart of a gradation correction process performed using the second calibration function. FIG. 6A is a characteristic conversion chart showing characteristics enabling reproduction of the density of an original image, and FIG. 6B is a view illustrating examples of image patterns for gradation correction.

First, a description will be given of the characteristic conversion chart shown in FIG. 6A. Quadrant I shows characteristics of the reader unit 100 for converting the image density of an original into a adhering toner amount signal. Quadrant II shows characteristics of the gradation control unit 211 (conversion table LUT_a) for converting the adhering toner amount signal into a laser output signal. Quadrant III shows characteristics of the printer unit 200 for converting the laser output signal into an output adhering toner amount. Quadrant IV shows the relationship between the density of an original and a target adhering toner amount, and the characteristics of the relationship represent overall gradation characteristics of the copying machine according to the present embodiment.

Figure 6A:
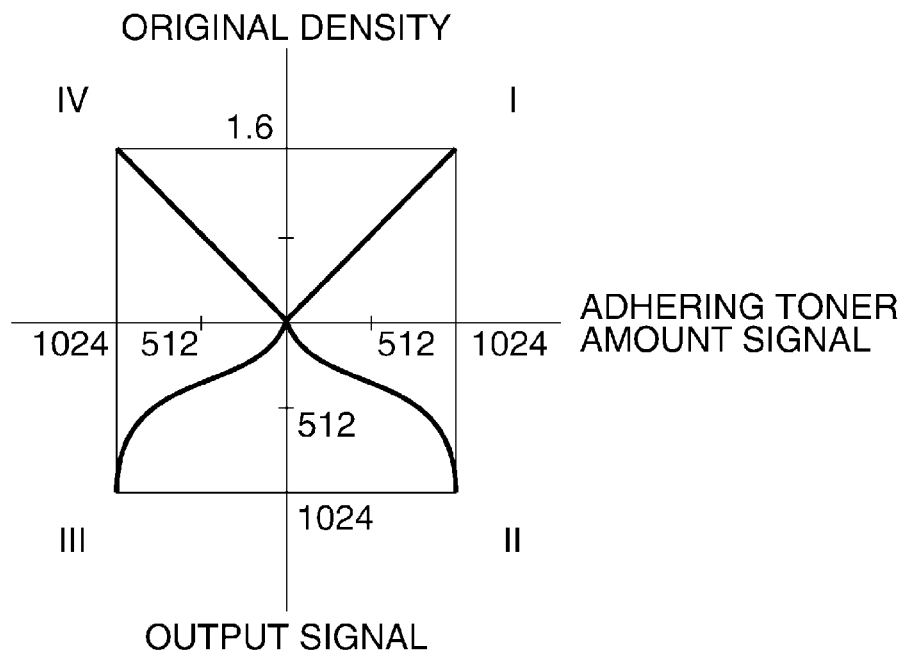
FIGS. 6A and 6B are a diagram and a view related to the second calibration function.

As shown in FIG. 6A, in the present image forming apparatus, in order to make the gradation characteristics in Quadrant IV linear, a curved portion of the recording characteristic of the printer unit in Quadrant III is corrected by the characteristics of the gradation control unit 211 in Quadrant II. The conversion table LUT_a of the γ correction circuit 1094 can be easily generated by inverting the input-output relationship in the characteristics in Quadrant III obtained when the output is produced without operating the gradation control unit 211. It should be noted that in the present embodiment, the number of output gradations is 256 which corresponds to an image signal bit number of 8, however, internal processing is performed using a 10-bit digital signal, and hence the number of gradations is equal to 1024 in FIG. 6A.

Next, the gradation correction process performed using the second calibration function will be described with reference to FIGS. 5 and 6B. The present process is controlled by the MFP controller 60.

Figure 6B:
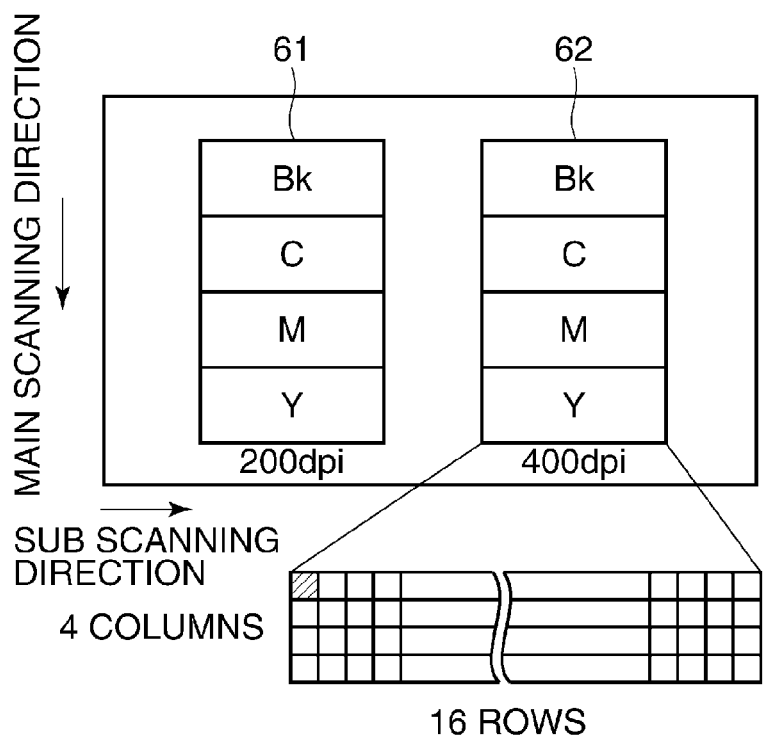

First, after execution of the first calibration function, a test print-2 shown in FIG. 6B is output on a specific recording sheet α (step S105 in FIG. 5). It should be noted that in the output of the test print-2, image formation is performed without operating the gradation control unit 211.

As shown in FIG. 6B, the test print-2 comprises gradation patch groups formed by patches for the colors Y, M, C, and Bk, each color patch comprising 4 (columns)×16 (rows) (assuming that the sheet illustrated in FIG. 6B is viewed in portrait orientation), i.e. a total of 64 gradations. To the 64 gradations, there are mainly assigned gradations in a low-density range of the 256 gradations. By doing this, it is possible to favorably adjust gradation characteristics in highlighted portions.

In FIG. 6B, reference numeral 61 denotes a gradation patch group having a resolution of approximately 160 to 180 lpi (lines/inch), while reference numeral 62 denotes a gradation patch group having a resolution of approximately 250 to 300 lpi. Formation of images of the respective resolutions can be achieved by performing dither processing on the image signal based on parameters for realizing the resolutions in the dither processing unit 1095 of the printer controller 109 and outputting the resulting signal from the writing unit 1096 after subjecting to as PWM (pulse width modulation).

It should be noted that the present image forming apparatus forms gradation images at a resolution of approximately 160 to 180 lpi, and line images, such as characters, at a resolution of approximately 250 to 300 lpi. In the present embodiment, gradation patterns are output at the two resolutions for the same gradation levels. However, when a difference in resolution causes a significant difference in gradation characteristics, it is more preferable to configure the gradation levels according to the resolution.

Next, the test print-2 is read by the reader unit 100 (step S106). The MFP controller 60 associates between a laser output level and a location of a corresponding patch of the gradation pattern on the specific recording sheet α, and stores the relationship between the laser output level and the adhering toner amount obtained by converting the read luminance using the conversion table LUTid_r, in a memory, such as the RAM (step S107).

Next, the printer characteristics shown in Quadrant III in FIG. 6A are determined based on the relationship determined (step S108). Then, by inverting the input-out relationship of the printer characteristics, the conversion table LUT_a of the γ correction circuit 1094 is generated which defines image forming conditions for the printer unit 200 (step S109).

In determining the conversion table LUT_a by computation, since there are only a number of data items corresponding to the number of gradations of the patch pattern, missing data items are generated by interpolation.

The above-described control process makes it possible to obtain a linear gradation characteristic with respect to the target adhering toner amount.

Next, with reference to FIG. 7, a description will be given of an auto calibration process executed using the specific recording sheet α by the color copying machine as the image forming apparatus according to the present invention.

In the auto calibration process by the color copying machine as the image forming apparatus according to the present invention, the first calibration function and the second calibration function are automatically performed in sequence. The auto calibration process can be configured as desired by the user. Further, the calibration in the present embodiment can be performed not only by the reader unit 100, but also by the color sensor 160. Therefore, the calibration is performed by either the reader unit 100 or the color sensor 160 according to the setting configured by the user in advance.

Figure 7:
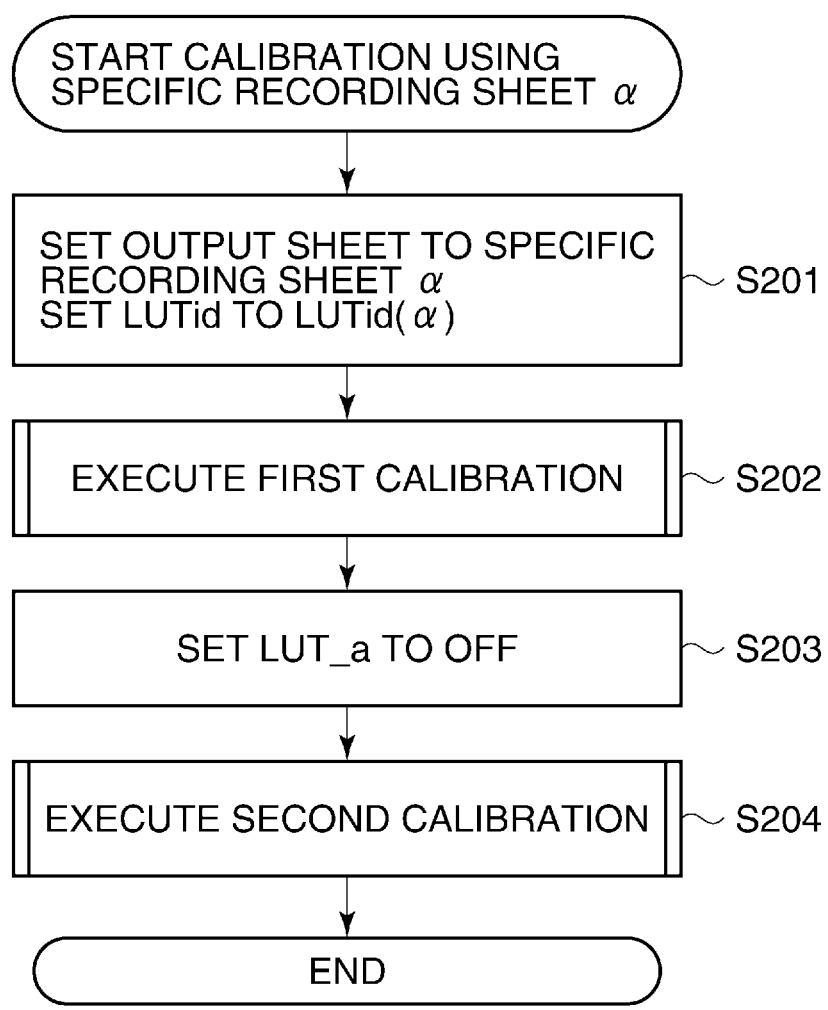
FIG. 7 is a flowchart of an auto calibration process performed using a specific recording sheet.

FIG. 7 is a flowchart of the auto calibration process performed using the specific recording sheet α.

First, a recording sheet is set to the specific recording sheet α, and the conversion table LUTid_r as the conversion table 1081 in FIG. 2 is set as a conversion table LUTid_r(α) for the specific recording sheet α. Alternatively, the LUTid_cs as the conversion table 1082 may be set as a LUTid_cs (α) for the specific recording sheet α (step S201). Thereafter, the first calibration function is executed (step S202), and then the conversion table LUT_a of the γ correction circuit 1094 is turned off (step S203), and then the second calibration function is executed (step S204).

It should be noted that an "auto calibration" button is displayed on a display screen of an operation panel, and when the user presses the button, the auto calibration process is executed.

According to the present embodiment, by carrying out the auto-calibration process, it is possible to effectively correct short-term or long-term and other various variations in image density, image reproducibility, and gradation reproducibility, to thereby output optimal images.

Next, a description will be given of how a type (recording medium type) of recording sheets for use in calibration is additionally registered.

One of the features of the present embodiment is that calibration performed using a recording sheet optionally selected by the user ensures both proper gradation characteristics and printer characteristics.

To only adjust gradation characteristics, it is only required to carry out the same operation as performed using the specific recording sheet, using an optionally selected recording sheet. In this case, however, a problem occurs with printer characteristics to be corrected. In a case where gradation characteristics are adjusted as desired, using the specific recording sheet, it is assumed that adhering toner amounts at respective stages in image formation are known, and the calibration is configured based on the known adhering toner amounts by design such that no defects appear in an image.

However, in a case where gradation characteristics are adjusted using an optionally selected recording sheet, it is not known how much toner is adhering to the recording sheet (recording medium) to realize a desired density or how much toner is adhering to each of the photosensitive drums so as to transfer the same onto the sheet by an amount corresponding to the desired density. When it is set to cause a larger amount of tone to adhere than expected during designing, trouble is caused in image transfer or fixing, which leads to occurrence of an image defect or a failure of the apparatus.

Figure 8:
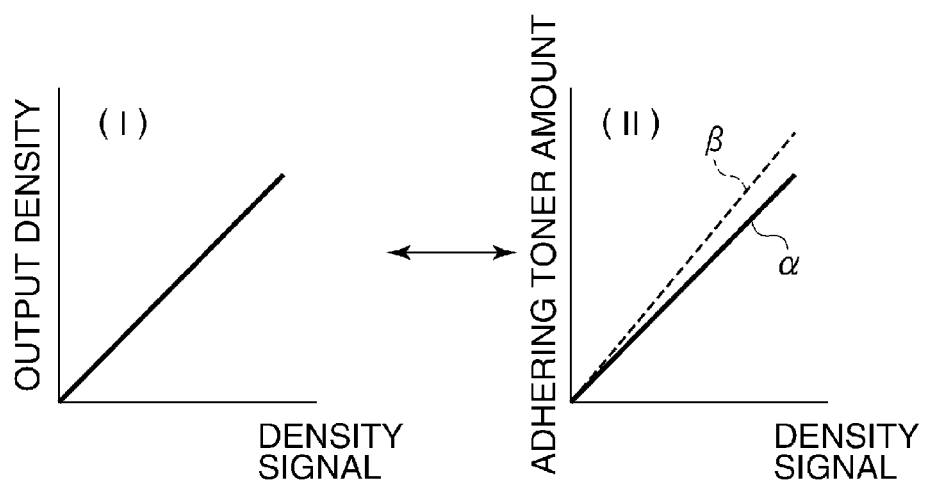
FIG. 8 is a diagram useful in explaining a difference between respective toner adhering amounts on different recording sheets with respect to the same density signal, on predetermined image forming conditions.

Let it be assumed that a recording sheet β is used which is difficult to give a desired density with the same amount of toner as used for the recording sheet α. Referring to FIG. 8, when image forming conditions are configured for both the recording sheet α and the recording sheet β such that the output density characteristics of a certain primary color can be obtained as shown in FIG. 8 (I), the adhering toner amount on the recording sheet β with respect to a density signal is larger than that on the recording sheet α, as shown in FIG. 8 (II). If a secondary color, a tertiary color, etc. are output in this state, a sheet will carry more toner than expected, which causes fixing failure leading to an image defect.

To solve the problem, in the present embodiment, a luminance-adhering toner amount conversion table LUTid(β) for a recording sheet β to be added is registered. This makes it possible to maintain the same printer characteristics as in a case where the recording sheet α is used, by the conversion table LUT_a, for any recording sheet.

It should be noted that when there are a plurality of added recording sheets, it is possible to register conversion tables LUTid(β) for the respective added recording sheets by a number corresponding to that of the added recording sheets, as conversion tables LUTid(β1), LUTid(β2), and so on.

Next, with reference to FIG. 9, a description will be given of a process for registering a conversion table for an added recording sheet.

Figure 9:
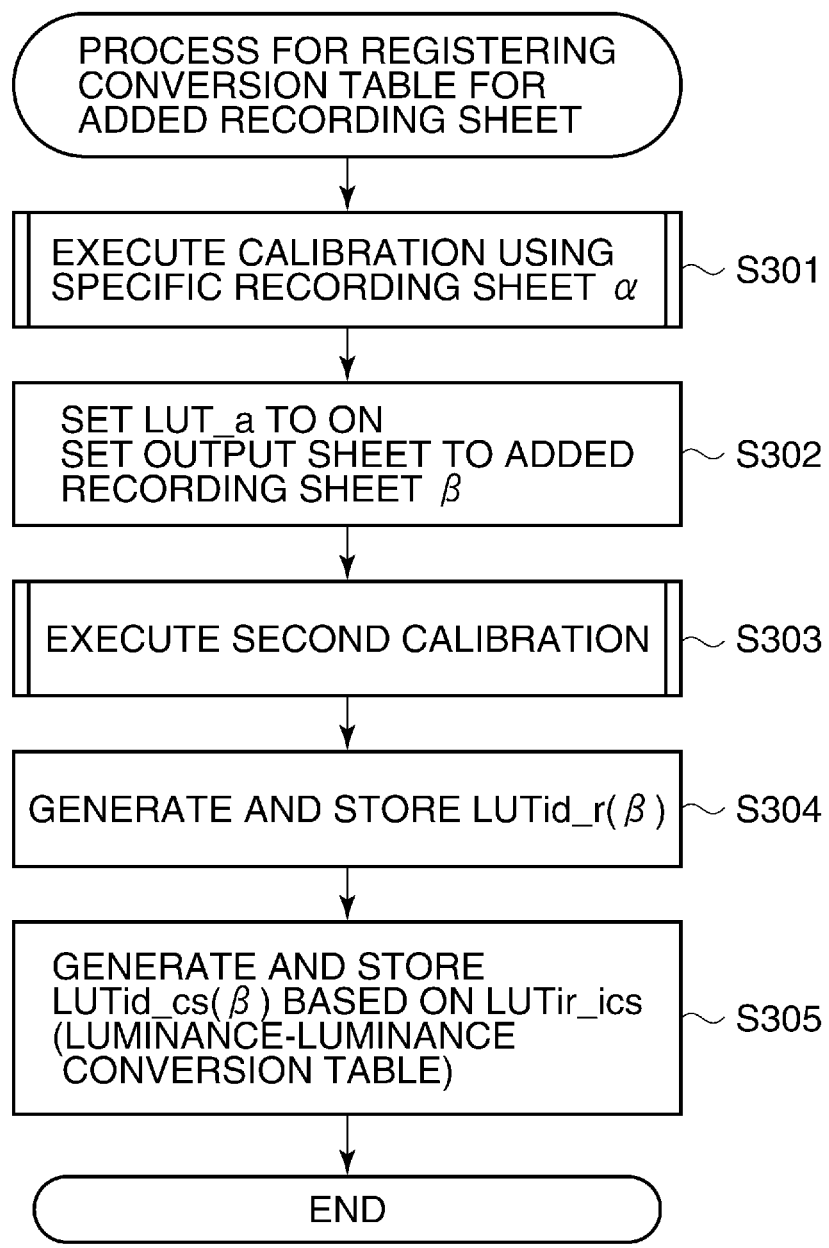
FIG. 9 is a flowchart of a process for registering a conversion table for an added recording sheet.

FIG. 9 is a flowchart of the process for registering a conversion table for an added recording sheet.

The calibration performed using the recording sheet α is executed as described above (step S301), and then a sheet to be output is set to the added recording sheet β while causing the conversion table LUT_a of the γ correction circuit 1094 to operate (step S302).

Subsequently, the second calibration function performed using the added recording sheet β is started (step S303). The printer unit 200 is configured based on the conversion table LUT_a of the γ correction circuit 1094 such that it has desired characteristics, and the toner adhering amount caused by the printer unit 200 is known, so that the relationship between the adhering toner amount and the luminance value of a scanned image can be determined.

Based on the thus obtained difference in luminance between the recording sheet α and the added recording sheet β for obtaining the same adhering toner amount, the MFP controller 60 generates a conversion table LUTid_r(β) for use in creating the conversion table LUT_a of the γ correction circuit 1094, using the added recording sheet β which is read by the reader unit 100 (step S304). The conversion table LUTid_r(β) is configured based on the relationship between the adhering toner amount on the added recording sheet β and the luminance value of the image read by the reader unit 100. The generated conversion table LUTid_r(β) is stored by linking it to added recording sheet information. It should be noted that the conversion table LUTid_r(β) is an example of a first conversion table in the present invention, and the step S304 is an example of a first configuration unit in the same.

By creating the conversion table LUTid_r(β) as described above, it is possible to perform calibration using the added recording sheet β, i.e. density control, in the reader unit 100.

Next, the MFP controller 60 carries out the following processing so as to enable calibration via the color sensor 160 to be performed using the added recording sheet β as well: The MFP controller 60 generates a conversion table LUTid_cs(β) for use in creating the conversion table LUT_a of the γ correction circuit 1094, using the added recording sheet β which is read by the color sensor 160 (step S305).

In the step S305, based on a correlation table LUTir_ics (see 1083 in FIG. 2) between the reader unit 100 and the color sensor 160, the conversion table LUTid_r(β) for the reader unit 100 is converted to the conversion table LUTid_cs(β) for the color sensor 160. The generated conversion table LUTid_cs(β) is stored by linking the same to added recording sheet information. It should be noted that the conversion table LUTid_cs(β) is an example of a second conversion table in the present invention, and the step S305 is an example of a second configuration unit in the same.

The correlation table LUTir_ics, which represents correlation in reading characteristics between the reader unit 100 and the color sensor 160, is stored in advance in a memory, such as the RAM of the MFP controller 60. More specifically, based on luminance-adhering toner amount conversion tables, shown in FIG. 10A, associated with the reader unit 100 and the color sensor 160, a luminance-luminance conversion table LUTir_ics, shown in FIG. 10B, between the reader unit 100 and the color sensor 160 is generated as the correlation table LUTir_ics, and the correlation table LUTir_ics is stored in advance e.g. before shipment from a factory.

Figure 11A:
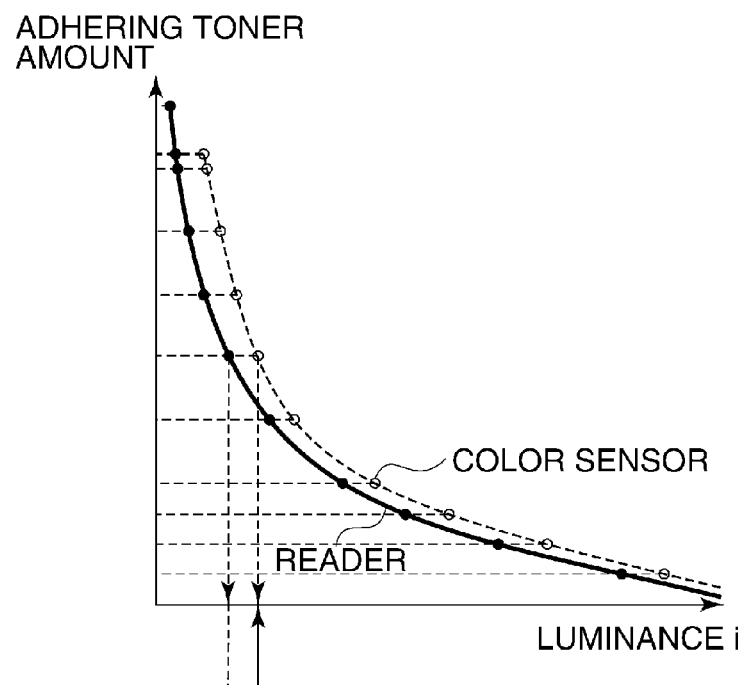
FIGS. 11A and 11B are diagrams useful in explaining a method of generating a correlation table.
Figure 11B:
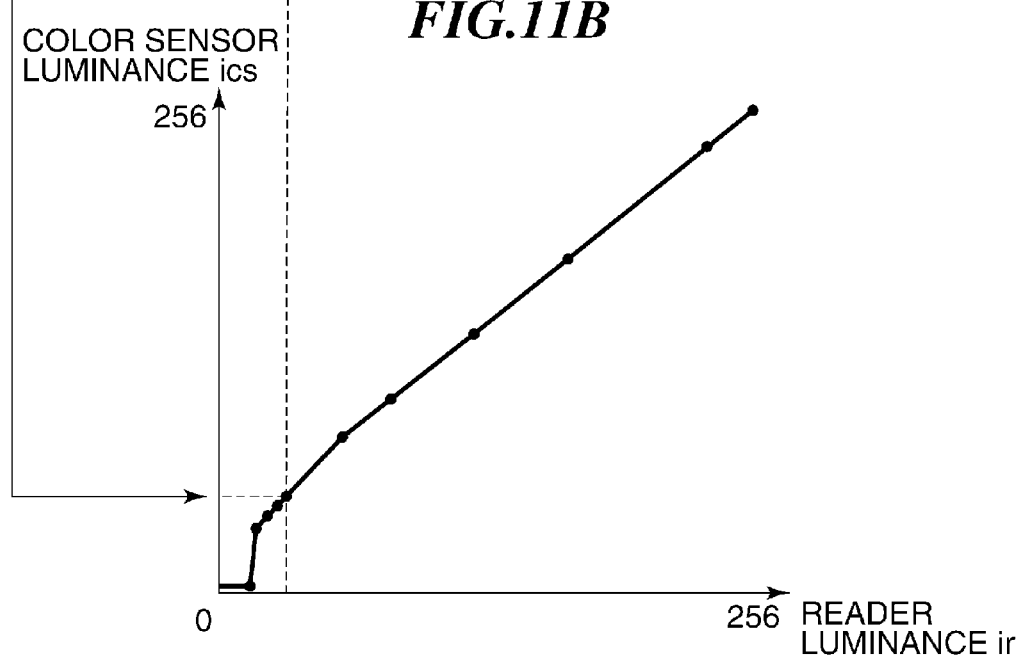

The correlation table, i.e. the luminance-luminance conversion table LUTir_ics is generated based on the 10A tables as described above. Now, the method of generating correlation table will be described in more detail. More specifically, as shown in FIGS. 11A and 11B, the correlation table is generated by plotting luminance values input when gradation patches identical in adhering toner amount are read by the reader unit 100 and the color sensor 160, respectively, and interpolating data missing due to insufficiency in the number of gradations patches.

Figure 12:
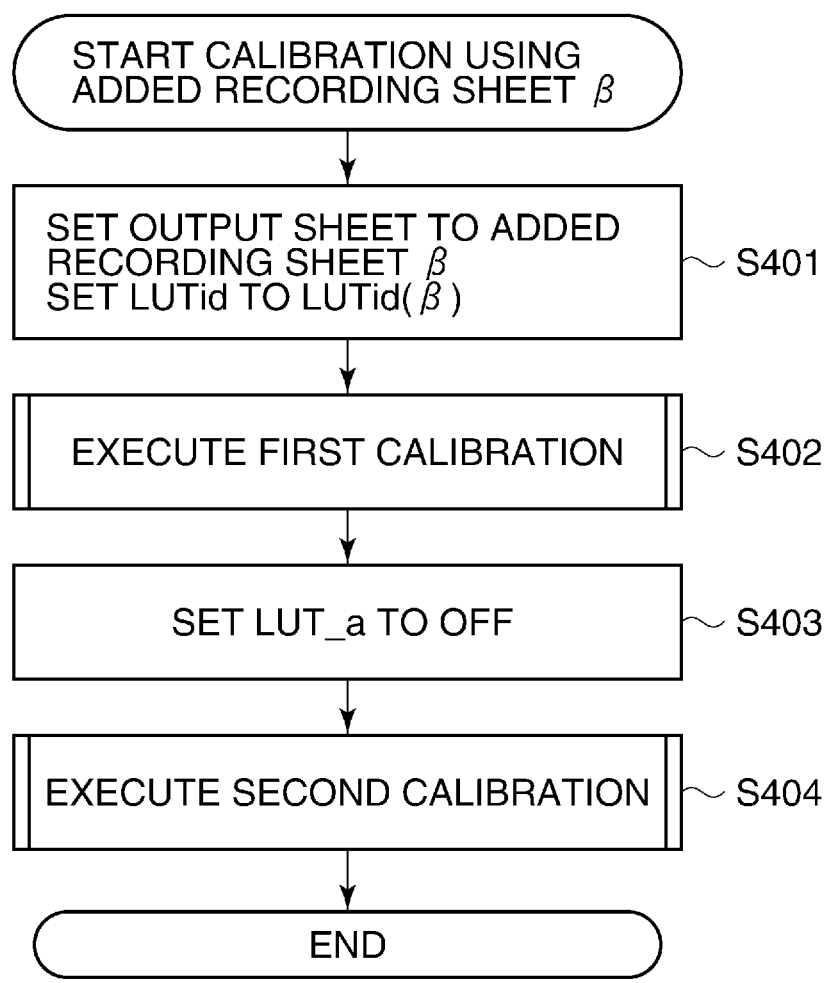
FIG. 12 is a flowchart of an auto calibration process performed using the added recording sheet.

With reference to FIG. 12, a description will be given of a case where calibration is performed by reading the added recording sheet β by the reader unit 100 or the color sensor 160.

FIG. 12 is a flowchart of an auto calibration process performed using the added recording sheet β.

The present process is distinguished from the auto calibration process performed using the specific recording sheet α (see FIG. 7) only in that the added recording sheet β is selected and the conversion table LUTid (α) for the specific recording sheet α is replaced by the conversion table LUTid (β) for the added recording sheet β(step S401). More specifically, the conversion table LUTid_r corresponding to the conversion table 1081 in FIG. 2 is set as the conversion table LUTid_r(β) for the added recording sheet β. Further, the conversion table LUTid_cs corresponding to the conversion table 1082 in FIG. 2 is set as the conversion table LUTid_cs (β) for the added recording sheet β.

The following steps S402 to S404 are the same as the steps S302 to S304 in FIG. 7. More specifically, in the case of performing calibration using the added recording sheet β, the MFP controller 60 executes the following processing: In a case where the added recording sheet β is read by the reader unit 100, the conversion table LUT_a of the γ correction circuit 1094 (image forming conditions) is configured based on image information read from the added recording sheet β and the conversion table LUTid_r(β), for correction of the amount of variation of the printer characteristics. On the other hand, in a case where the added recording sheet β is read by the color sensor 160, the conversion table LUT_a of the γ correction circuit 1094 is configured based on image information read from the added recording sheet β and the conversion table LUTid_cs(β), for correction of the amount of variation of the printer characteristics.

As described above, the relationship between the luminance value obtained by reading an image on the added recording sheet β by the reader unit 100 or the color sensor 160 and the adhering toner amount caused by the printer unit 200 is derived, whereby the difference in adhering toner amount between the specific recording sheet α and the added recording sheet β for obtaining an adhering toner amount corresponding to the same luminance value is calculated. Further, the difference is corrected by the conversion table LUTid_r or the conversion table LUTid_cs. Then, by performing calibration using the added recording sheet β, it is possible to generate the conversion table LUT_a of the γ correction circuit 1094 such that it makes the printer characteristics identical to those provided by the copying machine when desired gradation characteristics are obtained using the specific recording sheet α.

The image forming apparatus having a plurality of reading units, according to the present embodiment, provides the following advantageous effects:

(1) Simply by adding a recording sheet through calibration by one reading unit (e.g. the reader unit 100), it is possible to enable any other reading unit (e.g. the color sensor 160) to perform calibration using the added recording sheet.

(2) Calibration performed in the present embodiment makes it possible to accurately adjust printer output characteristics to desired conditions, for sheets optionally selected by a user. Therefore, it is possible to improve color reproducibility in a case where color management is performed using the printer controller 109 or an external ICC profile.

The correlation table LUTir_ics may be configured such that luminance-luminance conversion is not simply performed, but performed after execution of RGB-R'G'B' 3D conversion. In this case, it is possible to accommodate the wavelength distribution characteristics of the reader unit 100 and the color sensor 160 to thereby achieve further accurate correction.

Figure 10A:
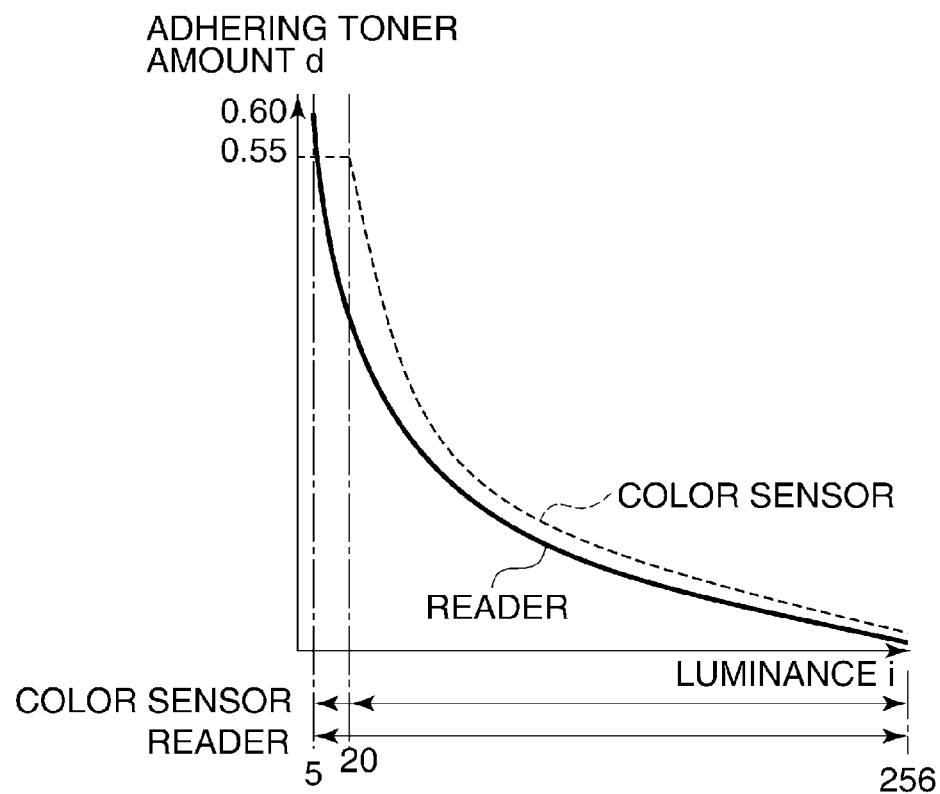
FIG. 10A is a diagram showing luminance-density conversion tables for a reader unit and a color sensor.
Figure 10B:
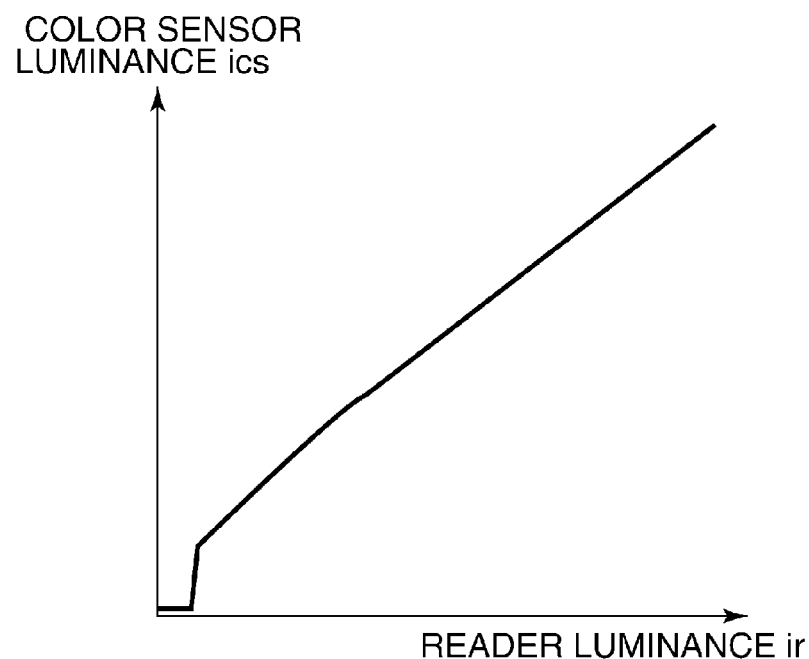
FIG. 10B is a diagram of a luminance-luminance conversion table for the reader unit and the color sensor.

As shown in FIG. 10A, the reader unit 100 used in the present embodiment is capable of reading up to an adhering toner amount of 0.60 mg/cm$^2$, and it has a luminance detection range of 5 to 256. On the other hand, the color sensor 160 is capable of reading up to an adhering toner amount of 0.55 mg/cm$^2$, and it has luminance detection range of 20 to 256. Therefore, the reader unit 100 is superior as a reading unit for gradation correction. For this reason, when adding a recording sheet, it is preferable to generate a conversion table LUTid_r(β) using the reader unit 100 and then reflect the results of the generation of the conversion table LUTid_r(β) on a conversion table LUTid_cs(β) for the color sensor 160, using the correlation table LUTir_.

In view of this point, in the present embodiment, an operation for adding the added recording sheet β is carried out using the reader unit 100 and then the conversion table LUTid_cs(β) for the color sensor 160 is generated. However, this is not limitative when characteristics are different. More specifically, an operation for adding the added recording sheet β may be carried out using a reading unit (i.e. the color sensor 160 in the present embodiment) other than the reader unit 100, and then the conversion table LUTid_r(β) for the reader unit 100 may be generated.

Further, in a case where an image forming apparatus has three or more reading units for use in correction (in the present embodiment, the image forming apparatus has the two reading units, i.e. the reader unit 100 and the color sensor 160), it is desirable to provide a conversion table for each of the reading units.

Next, a second embodiment of the present invention will be described with reference to FIG. 13. In the first embodiment, the description is given of the image forming apparatus in which the luminance-luminance conversion table (i.e. the correlation table LUTir_ics) is stored in advance. The second embodiment is distinguished from the first embodiment in that the luminance-luminance conversion table is generated, as required, so as to cope with aging of the image forming apparatus. It is to be understood that the arrangement and effects, not specified hereafter, of the second embodiment are the same as those of the first embodiment.

Figure 13:
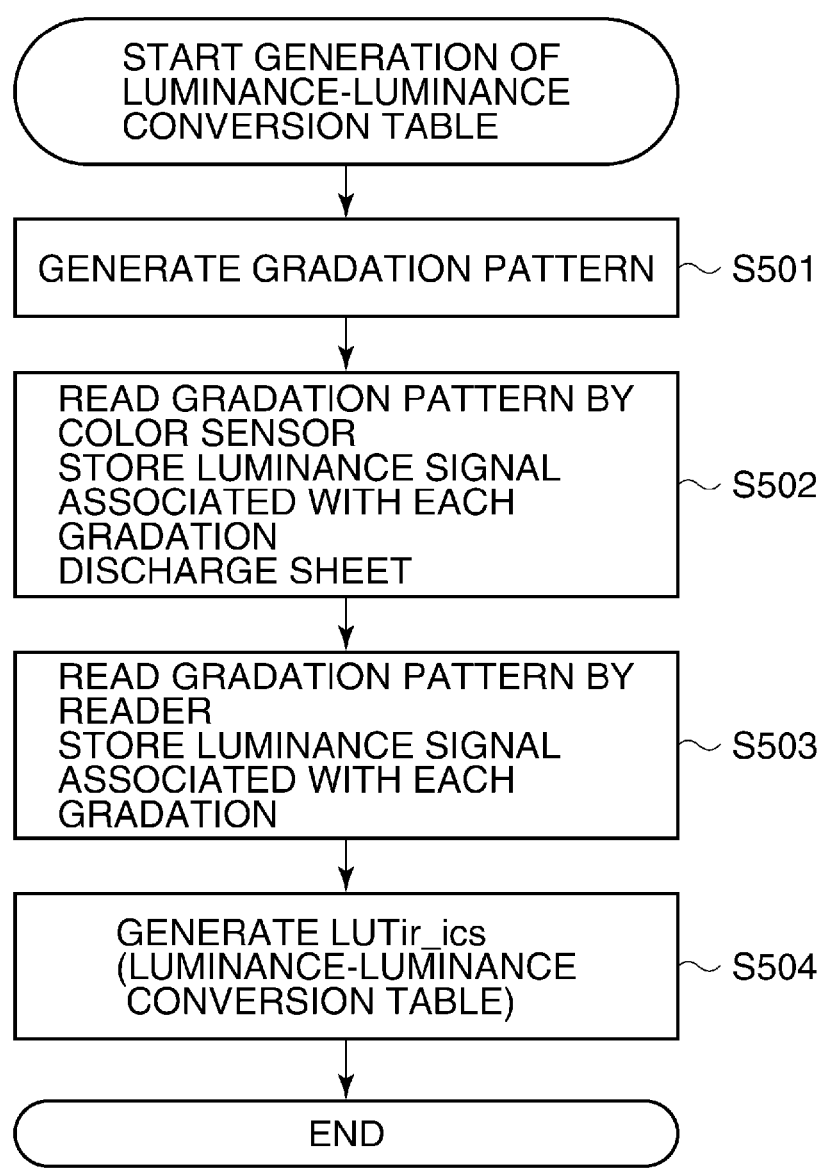
FIG. 13 is a flowchart of a luminance-luminance conversion table-generating process executed by a color copying machine as an image forming apparatus according to a second embodiment of the present invention.

FIG. 13 is a flowchart of a luminance-luminance conversion table-generating process executed in the second embodiment.

First, a gradation pattern is formed on a recording sheet of a designated type (step S501). The recording sheet having the gradation pattern image formed thereon is conveyed onto a conveying path where the color sensor 160 is disposed. When the gradation pattern image formed on the recording sheet is read by the color sensor 160 and, assuming that a gradation number indicative of each gradation is (i), a luminance value associated with each gradation is stored as Ir(i) in the RAM. Then, the recording sheet is discharged out of the image forming apparatus (step S502).

Next, the discharged recording sheet is placed on the reader unit 100, and similarly, a luminance value associated with each gradation is stored as Ics(i) (step S503). The luminance-luminance conversion table LUTir_ics is generated from the luminance values Ir(i) and Ics(i), which are obtained for the same gradation number (i), from the respective reading units (see FIGS. 11A and 11B) (step S504).

It should be noted that as for the relationship between the adhering toner amount and the luminance signal, as the adhering toner amount is smaller, the value of the luminance signal changes more sharply, and therefore e.g. when a sufficient number of gradations cannot be secured, it is desirable that patches with smaller adhering toner amounts (higher-luminance gradation patches) are generated in a more fine-grained manner.

According to the second embodiment, it is possible to accommodate error e.g. due to differences between the individual reading units to thereby generate a high-accuracy luminance-luminance conversion table. Therefore, whichever reading unit (the reader unit 100 or the color sensor 160) the user may use for gradation correction and density correction, there is little variation in density.

Although in the present embodiment, only the process for generating the luminance-luminance conversion table is described, the generation of the luminance-luminance conversion table may be executed sequentially when the process for adding a recording sheet type, described in the first embodiment, is executed.

Figure 14:
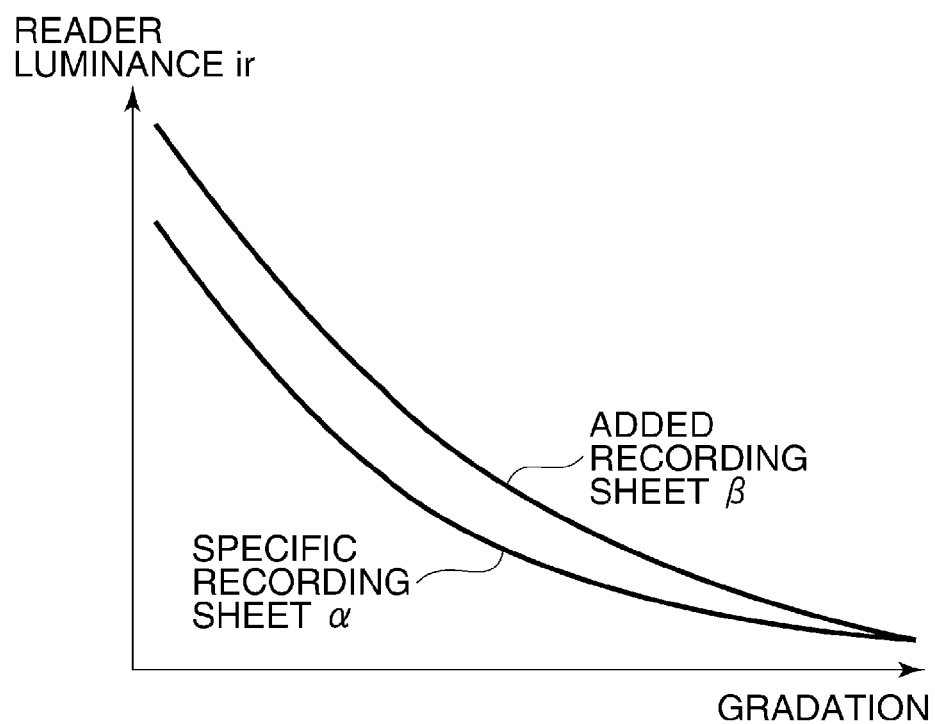
FIG. 14 is a diagram useful in explaining respective dynamic ranges of an image signal indicative of a gradation/luminance of an image associated with respective recoding sheets which are referred to when a luminance-luminance conversion table-generating process is executed by a color copying machine as an image forming apparatus according to a third embodiment of the present invention.

Next, a third embodiment of the present invention will be described with reference to FIG. 14. In the third embodiment, a recording sheet is designated before generation of the luminance-luminance conversion table (i.e. the correlation table LUTir_ics). It should be noted that arrangement and effects, not specified hereafter, of the third embodiment are the same as those of the first and second embodiments.

An image forming apparatus according to the present embodiment has a plurality of sheet feeders for feeding recording sheets, and recording sheet types are set on a sheet feeder-by-sheet feeder basis. As shown in FIG. 14, an image signal indicative of gradation/luminance of an image from a recording sheet has a wider dynamic range for an added recording sheet β than for the specific recording sheet α. Therefore, in the luminance-luminance conversion table-generating process, a sheet feeder registered in association with a recording sheet β that provides a wider dynamic range is selected e.g. automatically, and then the generation of the luminance-luminance conversion table is executed based on a registered luminance-density conversion table.

According to the present embodiment, even when the same gradation pattern is generated, luminance sensed by the sensor is increased, and therefore a higher S/N ratio is obtained, which makes it possible to generate a higher-accuracy luminance-luminance conversion table.

It should be noted that e.g. when the image forming apparatus is not provided with a plurality sheet feeders, a method may be employed in which sheet types having been additionally registered are displayed on an operation unit in the order of superiority in generation of the luminance-luminance conversion table so that the user can select a desired one from the sheet types.

In the third embodiment, a recording sheet that provides a wider luminance range when the reader unit 100 reads gradations is selected. This is because a recording sheet should be selected which makes the luminance difference between gradations more conspicuous over a range of a predetermined number of gradations. It is desirable to select at least a recording sheet which does not cause saturation of the luminance value over the range of the predetermined number of gradations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2009-261738 filed Nov. 17, 2009, which is hereby incorporated by reference herein in its entirety.

What is claimed is:

1. An image forming apparatus that has a calibration function of forming a predetermined image on a recording medium, reading the predetermined image formed on the recording medium, and setting image forming conditions based on information on the read predetermined image, comprising:
    a first reading unit configured to read a predetermined image on a first recording medium;
    a second reading unit provided separately from said first reading unit and configured to read the predetermined image on the first recording medium;
    a first configuration unit configured to execute the calibration function using the first recording medium and the first reading unit, form a predetermined image on a second recording medium other than the first recording medium, in a state where image forming conditions obtained as a result of the execution of the calibration function are set, cause said first reading unit to read the predetermined image formed on the second recording medium, and configure a first conversion table based on the read predetermined image on the second recording medium;
    a second configuration unit configured to configure a second conversion table based on the first conversion table configured by said first configuration unit, using a correlation table representing a correlation in reading characteristic between said first reading unit and said second reading unit; and
    a setting unit configured to be operable when said first reading unit is used to execute the calibration function using the second recording medium, to set the image forming conditions based on image information read by said first reading unit and the first conversion table, and when said second reading unit is used, to set the image forming conditions based on image information read by said second reading unit and the second conversion table.

2. The image forming apparatus according to claim 1, wherein the correlation table is generated based on respective results of reading of the predetermined image formed on the recording medium by the first reading unit and the second reading unit.

3. The image forming apparatus according to claim 2, further comprising a selection unit configured to select a predetermined recording medium, and wherein the correlation table is generated based on respective results of reading of the predetermined image formed on the selected predetermined recording medium by the first reading unit and the second reading unit.

* * * * *